(12) United States Patent
Nara et al.

(10) Patent No.: US 6,501,896 B2
(45) Date of Patent: Dec. 31, 2002

(54) OPTICAL WAVEGUIDE CIRCUIT

(75) Inventors: Kazutaka Nara, Tokyo (JP); Takeshi Nakajima, Tokyo (JP); Kazuhisa Kashihara, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/964,684

(22) Filed: Sep. 28, 2001

(65) Prior Publication Data

US 2002/0025133 A1 Feb. 28, 2002

Related U.S. Application Data

(63) Continuation of application No. PCT/JP00/02974, filed on May 10, 2000.

(30) Foreign Application Priority Data

May 31, 1999 (JP) ............................................ 11-151922
Nov. 4, 1999 (JP) ............................................ 11-313502
Jan. 5, 2000 (JP) ........................................ 2000-000380

(51) Int. Cl.$^7$ ................................................. G02B 6/10
(52) U.S. Cl. .......................... 385/129; 385/46; 385/24; 385/14
(58) Field of Search ................................ 385/129–132, 385/24, 14, 46, 37, 123, 39

(56) References Cited

U.S. PATENT DOCUMENTS 6,389,209 B1 * 5/2002 Suhir ......................... 385/129
6,442,314 B2 * 8/2002 Nara et al. ..................... 385/37

FOREIGN PATENT DOCUMENTS

EP 0 907090 A2 4/1999
JP 08-136754 5/1996

OTHER PUBLICATIONS

S. Suzuki et al., "Polarisation–insensitive arrayed–waveguide gratings using dopant–rich silica–based glass with thermal expansion adjusted to Si substrae"., Electronic Letters, Jun. 1997, vol. 33, No. 13, p. 1173–1174.

S.M. Ojha et al., "Simple method of fabricating polarization–insensitive and very low crosstalk AWG grating devices"., Electronic Letters, Jan. 1998, vol. 34, No. 1, p. 78–79.

R.G. Peall, "Planar Waveguide Optical Network Components for High Capacity Telecommunications"., Proceedings of International Workshop on Optics Design and Fabrication ODF'98, Tokyo, Jun. 1998, p. 49–52.

* cited by examiner

Primary Examiner—Phan T. H. Palmer
(74) Attorney, Agent, or Firm—Oblon, Spivak, McClelland, Maier & Neustadt, P.C.

(57) ABSTRACT

The present invention relates to an optical waveguide circuit such as an arrayed waveguide grating, etc. A lower cladding is formed on a silicon substrate. A core having the following waveguide construction is formed thereon. That is, an input side slab waveguide is connected to the emission side of a plurality of incidence waveguides, a plurality of arrayed waveguides having different lengths form each other are juxtaposed at and connected to the emission side thereof, an output side slab waveguide is further connected to the emission side thereof, and a plurality of emission waveguides are connected to the emission side thereof, thereby causing the abovementioned waveguide construction. The upper cladding covers up the core. The cladding and core are made of silica-based glass, wherein the value B of birefringence occurring in said optical waveguide portion is $|B| \leq 5.34 \times 10^{-5}$, and $\alpha s - 2.0 \times 10^{-7} \leq \alpha g \leq \alpha s + 2.0 \times 10^{-7}$ is established where it is assumed that the thermal expansion coefficient of the upper cladding is $\alpha g$, and the thermal expansion coefficient of a silicon substrate is $\alpha s$.

4 Claims, 7 Drawing Sheets

OPTICAL WAVEGUIDE CIRCUIT

CROSS REFERENCE TO RELATED APPLICATIONS

This application is a continuation of prior International application No. PCT/JP00/02974 filed on May 10, 2000. Which was not published in English.

TECHNICAL FIELD OF THE INVENTION

The present invention relates to an optical waveguide circuit such as an arrayed waveguide grating used for optical transmissions, etc.

BACKGROUND OF THE INVENTION

Recently, optical wavelength multiplexing transmissions have been researched and studied as a method for remarkably increasing transmission capacity, some of which have been used in practical applications. Such an optical wavelength multiplexing transmission is used to transmit, for example, a plurality of light having different wavelengths through multiplexing. In such an optical wavelength multiplexing transmission system, in order to pick up light wavelength by wavelength at the light receiving side from a plurality of transmitted light, it is indispensable that an optical transmission element, etc., which can transmit only light having predetermined wavelengths is provided in the system.

As one example of optical transmission elements, there is an arrayed waveguide grating (AWG: Arrayed Waveguide Grating) as shown in, for example, FIG. 6. The arrayed waveguide grating is such that it has a waveguide construction, as shown in the same drawing, on a substrate 11. The waveguide construction of the arrayed waveguide grating is as shown below. That is, an input side slab waveguide 13 is connected to the emission side of incidence waveguides 12 as one or more optical input waveguides juxtaposed to each other. And, a plurality of juxtaposed waveguides 14 are connected to the emission side of the input side slab waveguide 13. An output side slab waveguide 15 acting as the second slab waveguides is connected to the emission side of the plurality of arrayed waveguides 14. Emission waveguides 16 acting as a plurality of juxtaposed optical output waveguides are connected to the emission side of the output slab waveguide 15.

The arrayed waveguides 14 propagate light introduced from the input side slab waveguide 13, and are formed so as to have lengths different from each other. Also, the emission waveguides 16 are provided so as to correspond to the number of signal light, divided by, for example, an arrayed waveguide grating, having wavelengths different from each other. In addition, a number (for example, 100 lines) of arrayed waveguides 14 are usually provided. However, in the same drawing, in order to simplify the drawing, the number of the respective waveguides 12, 14, and 16 is simplified for illustration.

For example, transmission side optical fibers are connected to the incidence waveguides 12, into which wavelength multiplexed lights are introduced. Subsequently, light which is introduced into the input side slab waveguide 13, passing through the incidence waveguides 12, is diffracted by the diffraction effect thereof, and made incident into a plurality of respective arrayed waveguides 14, wherein the light propagates through the respective arrayed waveguides 14.

Light which propagated through the respective arrayed waveguides 14 reaches the output side slab waveguide 15, and is further condensed at the emission waveguides 16 for output. Also, since the lengths of the respective arrayed type waveguides 14 differ from each other, a shift occurs in the phases of individual lights after they propagated through the respective arrayed waveguides 14. And, the phase front of a light from the arrayed waveguide is inclined in compliance with the quantity of the tilt, wherein the position of condensing the light is determined by the angle of the inclination, and the light condensing positions of light having different wavelengths differ. By forming the emission waveguides 16 at the condensing positions of light having different wavelengths, it is possible to output light having different wavelengths from the emission waveguides 16 wavelength by wavelength.

For example, as shown in the same drawing, as wavelength multiplexed light having wavelengths $\lambda 1, \lambda 2, \lambda 3, \ldots \lambda n$ (n: an integral number) is inputted from one incidence waveguide 12, the light is diffracted by the input side slab waveguide 13. And, it reaches the arrayed waveguides 14, and as described above, is condensed at different positions on the basis of wavelength, passing through the output side slab waveguide 15. Light having different wavelengths is made incident into different emission waveguides 16, and are outputted from the emission ends of the emission waveguides 16, passing through the respective emission waveguides 16. And, since optical fibers for light output are connected to the emission ends of the respective emission waveguides 16, it is possible to pick up light of respective wavelengths via the optical fibers.

In the arrayed waveguide grating, the wavelength resolution of the diffraction grating is proportional to a difference ($\Delta L$) in length of the respective arrayed waveguides 14. Therefore, by designing the $\Delta L$ so as to become larger, it will become possible to multiplex and demultiplex wavelength multiplexed light having narrow wavelength intervals, which could not be achieved in prior arts. That is, the arrayed waveguide grating can achieve light multiplex and demultiplex functions (functions to multiplex and demultiplex a plurality of light signals having a wavelength interval of 1 mn or less), which are required in achievement of a high bite rate optical wavelength multiplexed transmission.

The abovementioned arrayed waveguide grating is an optical waveguide circuit that is formed so that an optical waveguide portion 10 having a lower cladding, a core and an upper cladding, which are formed of silica-based glass, is formed on a substrate 11 made of silicon, etc. The arrayed waveguide grating is such that the lower cladding is formed on the substrate 11 made of silicon, etc., the core which constitutes the abovementioned waveguide is formed thereon, and the upper cladding is further formed on the core so as to cover the core. In addition, the upper cladding was made of silica-based glass to which, $B_2O_3$ and $P_2O_5$ are, respectively, doped on pure silica glass at a ratio of 5 mole %.

FIG. 7 shows a manufacturing process of the arrayed waveguide grating. Hereinafter, a description is given of the manufacturing method of an optical waveguide circuit with reference to the same drawing. First, as shown in the same drawing (a), a film of the lower cladding 1b and a film of the core 2 are formed on the silicon substrate 11 in order. Next, as shown in the same drawing (b), photolithography and reactive ion etching method are applied thereto, using a mask 8. By the application, as shown in the same drawing (c), an optical waveguide pattern of the arrayed waveguide grating is formed by processing the film of the core 2, whereby the core 2 of the optical waveguide construction is formed.

Next, as shown in the same drawing (d), a film of the upper cladding 1a is formed on the upper side of the core 2 in a form embedding the core 2. In addition, the film of the upper cladding 1a is formed by depositing the upper cladding glass particles 5 by the flame hydrolysis deposition method and consolidating the upper cladding glass particles 5 at, for example, 1200° C. through 1250° C.

However, originally, in an arrayed waveguide grating that is applied as optical transmission elements for optical wavelength multiplexed transmissions as described above, it is preferable that the polarization dependency loss (PDL) in the TE mode and TM mode is as close to zero as possible. However, in the prior art arrayed wavelength grating, the abovementioned polarization dependency loss (PDL) was 3 dB where the center wavelength $\lambda c$ is in a range of ±0.1 nm.

Therefore, in order to compensate the polarization dependency loss, the prior art arrayed waveguide grating was constructed as shown in FIG. 8. That is, a half-wave plate 3 formed of polyimide, etc., is inserted into the middle way of the arrayed waveguide 14 in the form of crossing all the arrayed waveguides 14. If so, a polarized wave propagating through the arrayed waveguide grating is turned by 90 degrees at the incidence side and the emission side of the half-wave plate 3, and influences resulting from the abovementioned polarization dependency loss can be evaded. Also, the material of the half-wave plate 3 is not limited to polyimide, but it may be made of a silica-based glass material. However, since, if it is made of polyimide, the thickness thereof can be made thinner, a polyimide-made half-wave plate was most excellent as the half-wave plate 3 in the prior art arrayed waveguide grating.

However, as described above, if the arrayed waveguide grating is formed by inserting a half-wave plate 3, a so-called return loss occurs, in which a part of the light incident into the half-wave plate 3 returns to the incidence side of the incidence waveguides 12. In a case where the half-wave plate 3 is inserted vertical to the arrayed waveguides 14, the value of the return loss becomes approx. −35 dB. Thus, if a return loss exceeding −40 dB is produced in elements used for an optical wavelength multiplexed transmission system, the arrayed waveguide grating will not be able to be used for optical waveguide multiplexed transmissions.

In addition, in a case where the half-wave plate 3 is inclined unvertical by 8 degrees with respect to an axis vertical to the arrayed waveguides 14, the return loss can be suppressed by around −40 dB. However, in this case, even though a thin half-wave plate 3 made of polyimide is applied, it will become difficult for a slit, through which the half-wave plate 3 is inserted, to be formed and for the half-wave plate 3 itself to be inserted in view of the technical aspect. Therefore, in this case, another problem occurs, that is, the yield of arrayed waveguide gratings is lowered due to insertion of the half-wave plate 3.

In addition, if an attempt is made to juxtapose arrayed waveguides 14 to each other since the length of a polyimide-made half-wave plate 3 utilized at present is approx. 8 mm, only 320 arrayed waveguides 14 can be disposed at most. Therefore, even though an attempt is made to increase the number of arrayed waveguides 14 in order to achieve an arrayed waveguide grating having a narrow interval in future, a limitation is produced in the number of arrayed waveguides 14, and it becomes difficult to meet the requirement. Also, if an attempt is made to lengthen the polyimide-made half-wave plate 3, the production yield of the half-wave plates 3 themselves is lowered, and in line therewith, production costs of the arrayed waveguide gratings will be increased.

Still further, since a half-wave plate 3 is inserted into and fixed in an insertion slit worked at an arrayed waveguide grating by a dicer, etc., it becomes necessary to work the insertion slit in order to provide the half-wave plate 3. And, the half-wave plate 3 is inserted into the slit and is fixed with an adhesive agent, etc. For this reason, the number of processes of manufacturing arrayed waveguide gratings is increased, wherein still another problem occurs, that is, production costs of the arrayed waveguide grating are accordingly increased.

SUMMARY OF THE INVENTION

The present invention was developed to solve the above-mentioned problems, and it is therefore an object of the invention to provide an optical waveguide circuit such as an arrayed waveguide grating having characteristics shown in (1) through (3) below: (1) an optical waveguide circuit provided by the invention can be manufactured by a fewer number of processes, and production costs thereof are inexpensive, (2) an optical waveguide circuit provided by the invention is excellent in return loss characteristics, and can suppress influences of polarization dependency loss, and (3) an optical waveguide circuit provided by the invention can construct an arrayed waveguide grating in which 320 or more arrayed waveguides can be juxtaposed to each other at intervals of 25 $\mu$m.

In order to achieve the objects, the invention employs the following construction and means to solve the problems. According to the first aspect of the invention, an optical waveguide is an optical waveguide portion made of a lower cladding, a core and an upper cladding formed of silica-based glass is formed on a silicon substrate, wherein a value B of birefringence occurring at said optical waveguide portion is $|B| \leq 5.34 \times 10^{-5}$.

According to the second aspect of the invention, an optical waveguide circuit is, in addition to the first aspect, where it is assumed that the thermal expansion coefficient of the upper cladding is $\alpha g$, and the thermal expansion coefficient of a silicon substrate is $\alpha s$, $\alpha s - 2.0 \times 10^{-7} \leq \alpha g \leq \alpha s + 2.0 \times 10^{-7}$ is established.

According to the third aspect of the invention, an optical waveguide circuit is that said arrayed waveguide grating is constructed by an optical waveguide circuit according to said first or second aspect, wherein a first slab waveguide is connected to the emission side of one or more juxtaposed optical input waveguides; a plurality of juxtaposed arrayed waveguides having different lengths from each other, which propagate light introduced from said first slab waveguide, are connected to the emission side of said first slab waveguide; a second slab waveguide is connected to the emission side of said plurality of arrayed waveguides; a waveguide construction, in which a plurality of juxtaposed optical output waveguides are connected to the emission side of said second slab waveguide, is formed of a core; and a plurality of optical signals having different wavelength from each other, which are inputted from said optical input waveguides, are caused to propagate with a difference in phase secured per wavelength by said arrayed waveguides, and are inputted into optical output waveguides differing per wavelength; whereby an arrayed waveguide grating is constructed, which outputs light having wavelengths different from each other through different optical output waveguides.

For example, in a case where the arrayed waveguide grating is applied to an optical wavelength multiplexed transmission system, it is preferable that the polarization dependency loss (PDL) in the TE mode and TM mode, being a polarization mode, is as close to zero as possible. Therefore, the inventor examined to which value the PDL of the arrayed waveguide grating is set for adequate optical wavelength multiplexed transmissions. As a result, it was found it was preferable that the PDL was set to 0.5 dB or less. And, in order to make the PDL smaller than 0.5 dB, the inventor also examined through simulation experiments to which value the quantity of center wavelength shift in the TE mode and TM mode in the arrayed waveguide grating is adequately set.

In the examination, first, optical transmission spectra in the respective polarization modes (TE mode and TM mode) of the arrayed waveguide grating were, respectively, measured. Also, it was assumed that the maximum value in difference between the transmission loss in the TM mode at the center wavelength $\pm\beta$ ($\beta$ is a predetermined value, for example, 0.8 nm) in the TE mode and the transmission loss in the TM mode at the center wavelength $\pm\beta$ in the TM mode is a polarization dependency loss. And, for example, the transmission spectrum in the TM mode is caused to gradually shift in a suspected state with the transmission spectrum in the TE mode fixed, and the quantity of the shift was determined to be the center wavelength shift in the polarization mode. The polarization dependency loss is plotted with respect to the quantity of center wavelength shift to draw a graph. And, on the basis of the graph, the relationship between the quantity of center wavelength shift by the polarization mode and the polarization dependency loss was obtained.

The result is shown in FIG. 2. As shown in the same drawing, by setting the quantity of center wavelength shift in the TE mode and TM mode, which is the polarization mode in the arrayed waveguide grating, to 0.05 nm or less, it could be confirmed that the abovementioned PDL was made smaller than 0.5 dB. Therefore, the inventor determined that, in the case where an arrayed waveguide grating is used as an optical wavelength multiplexing transmission, an adequate shift quantity AXB of the center wavelength in the TE mode and TM mode is 0.05 nm or less.

Also, in an optical waveguide circuit such as an arrayed waveguide grating, etc., it is considered that the shift in the optical transmission center wavelength by the abovementioned polarization mode is influenced by a value of birefringence occurring in the optical waveguide portion. The quantity $\Delta\lambda_B$ of center wavelength shift by the polarization mode can be expressed by the following equation, using a value B of birefringence occurring in the optical waveguide portion, a effective refractive index nc of the core, and center wavelength $\lambda_O$ of light propagating through the core:

$$\Delta\lambda_B = |B \cdot \lambda_O / nc| \tag{1}$$

Herein, in order to find out the optimal birefringence value in the case where an arrayed waveguide grating is applied to an optical wavelength multiplexed transmission system which is now under consideration, if $\lambda_O$ and nc are determined as follows, the range of value B of birefringence occurring in the optical waveguide portion was obtained. And, the $\lambda_O$ was determined to be 1550 nm which is the center wavelength in the optical wavelength multiplexed transmission system under consideration. Also, the refractive index of the core is determined by a composition of the core, and is determined to be approximately 1.45.

Where the value B of the birefringence is set in a range of $|B| \leq 5.34 \times 10^{-5}$, it was found that the value of $\Delta\lambda_B$ of the quantity of center wavelength shift by the polarization mode could be set in the range. That is, it was found that, by setting the value B of the birefringence, the polarization dependency loss could be determined in the loss range required for an arrayed wavelength grating.

On the basis of the results of the abovementioned examinations, in the optical wavelength circuit according to the invention, the value B of the birefringence occurring in the optical waveguide portion is determined to be an adequate value of $|B| \leq 5.34 \times 10^{-5}$. In the other words, the stress provided onto the core by the stress applied from the cladding onto the core is made smaller. Accordingly, in the invention, the quantity of center wavelength shift in the abovementioned TE mode and TM mode in an optical waveguide circuit is established to be a value of 0.05nm or less, and the value of the polarization dependency loss (PDL) can be set to an adequate value of 0.5 dB or less.

Therefore, if an optical waveguide circuit according to the invention is applied to an optical wavelength multiplexed transmission system having, for example, a wavelength band of 1.55 $\mu$m, it is possible to provide an optical waveguide circuit that can suppress influences of the polarization dependency loss without providing any half-wave plate. In further detail, as in the third construction of the invention, where an optical waveguide circuit is applied to an optical wavelength multiplexed transmissions system having a wavelength band of 1.55 $\mu$m as an arrayed waveguide grating, it is possible to construct an arrayed waveguide grating that is capable of suppressing influences of the polarization dependency loss without providing any half-wave plate.

And, in the arrayed waveguide grating, the number of manufacturing processes can be accordingly reduced since no half-wave plate is required, whereby yield thereof can be increased to accordingly reduce the production cost thereof. In addition, the arrayed waveguide grating can be made so that it can accommodate, for example, 320 or more arrayed waveguides at internals of 25 $\mu$m, wherein it is possible to increase the number of channels.

Also, in the invention, by establishing $\alpha s$, $\alpha s - 2.0 \times 10^{-7} \leq \alpha g \leq \alpha s + 2.0 \times 10^{-7}$ where it is assumed that the thermal expansion coefficient of the upper cladding is $\alpha g$, the thermal expansion coefficient of the upper cladding can be optimized.

Therefore, if an optical waveguide circuit according to the invention is thus constructed, it is possible to obtain an optical waveguide circuit that can bring about the abovementioned excellent effects.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

In order to describe the invention in detail, a description is given of respective embodiments of the invention with reference to the accompanying drawings. Also, in the description of the embodiments, parts that are identical to those in the arrayed waveguide grating described above are given the same reference numbers, and overlapping description thereof is omitted.

Figure 1:
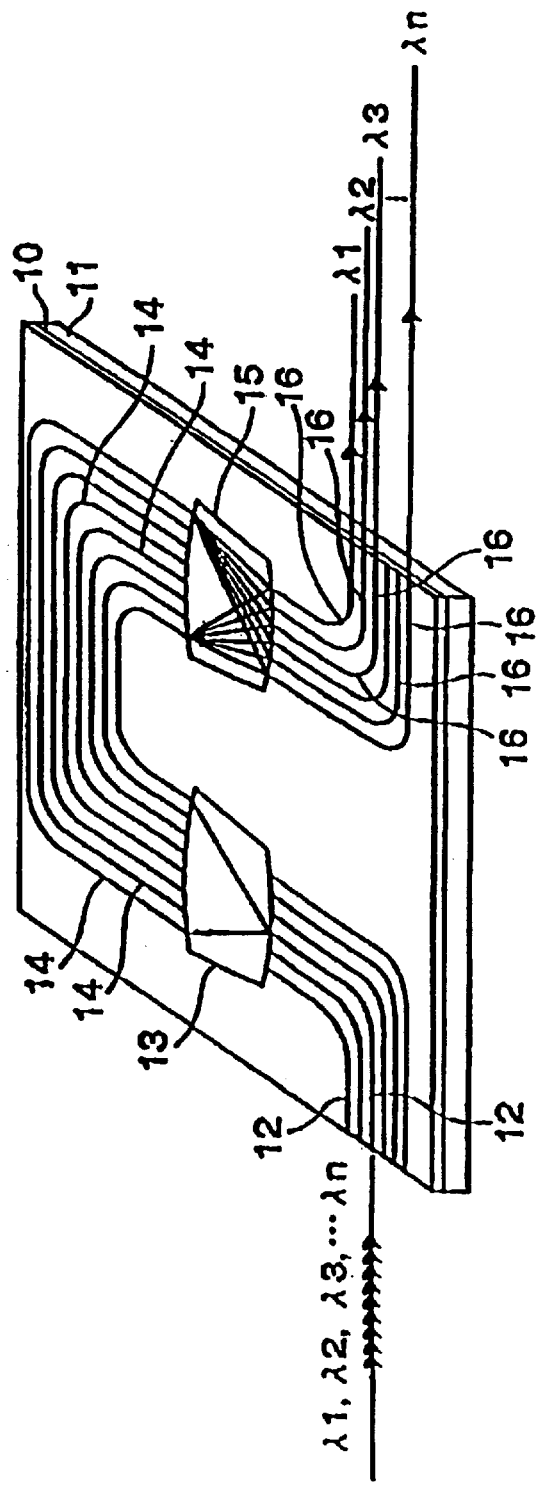
FIG. 1 is a configurational view of the major parts exemplarily showing an arrayed waveguide grating applied as one embodiment of an optical waveguide circuit according to the invention.
Figure 6:
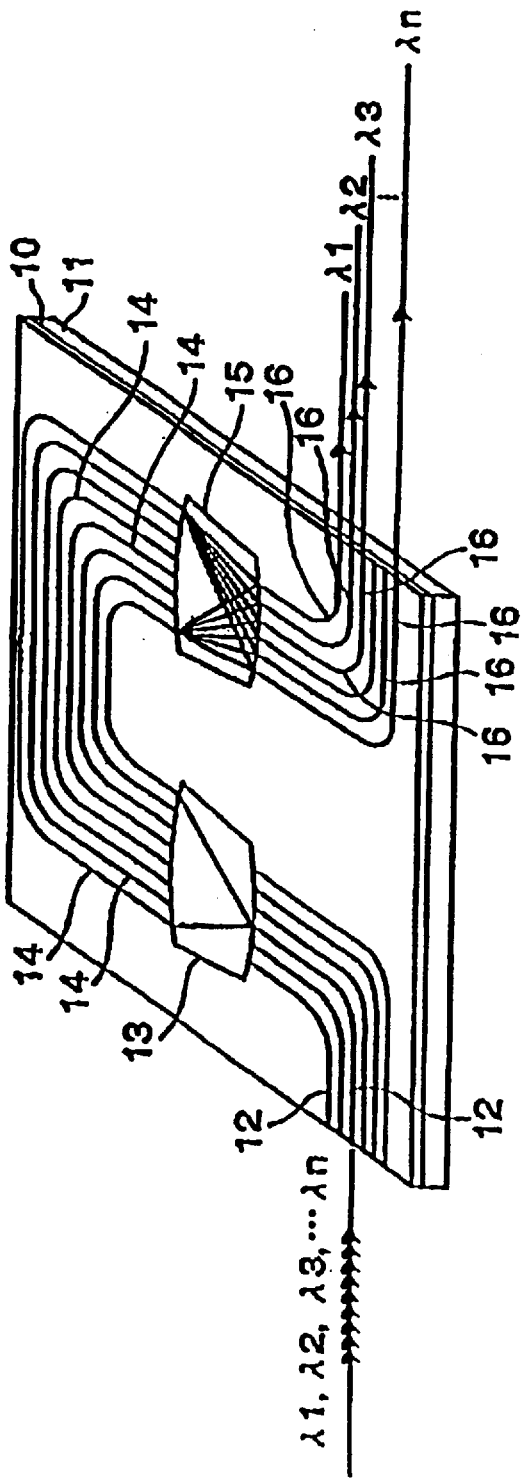
FIG. 6 is an exemplary view showing a prior art arrayed waveguide grating.

First, a description is given of the first embodiment of an optical waveguide circuit according to the invention. An optical embodiment of the invention is an arrayed waveguide grating shown in FIG. 1, and it has a silicon substrate 11 and an optical waveguide portion 10 as in the arrayed waveguide grating shown in FIG. 6. Also, in an arrayed waveguide grating according to the embodiment, the waveguide construction of the optical waveguide portion 10 is similar to that of the arrayed waveguide grating illustrated in FIG. 6.

Figure 8:
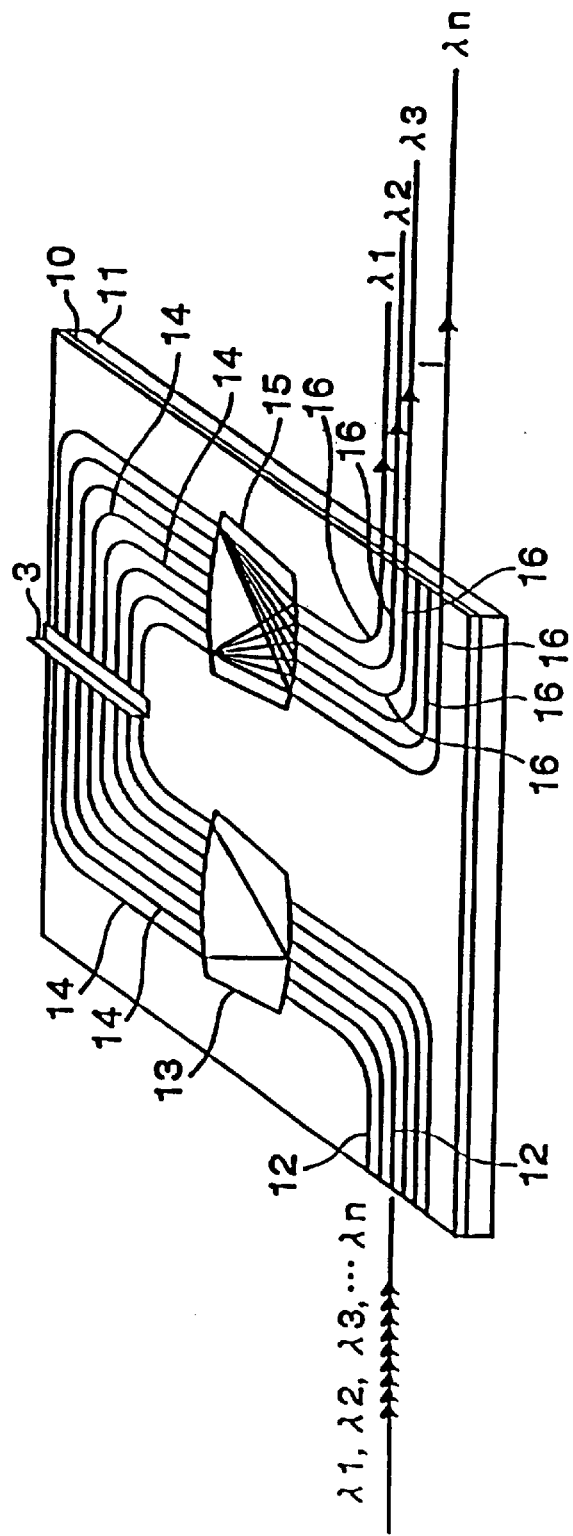
FIG. 8 is an exemplary view showing a prior art arrayed waveguide grating constructed of a half-wave plate.

An arrayed waveguide grating according to the embodiment is characteristic in that the value B of the birefringence occurring in the optical waveguide portion 10 (upper cladding 1a, core 2 and lower cladding 1b) is made into a characteristic value, that is, $|B| \leq 5.34 \times 10^{-5}$. By the construction, in the embodiment, it is possible to reduce influences of the polarization dependency loss without providing any half-wave plate 3, which is provided in the prior art arrayed waveguide grating illustrated in FIG. 8, wherein the embodiment is constructed as an optical waveguide circuit suitable for optical wavelength multiplexed transmissions.

In the embodiment, the upper cladding 1a is formed of silica based glass ($SiO_2$—$B_2O_3$—$P_2O_5$ based), in which $B_2O_3$ and $P_2O_5$ are, respectively, doped onto pure silica glass ($SiO_2$) at a ratio of approx. 8 mole %. In the embodiment, by constructing the above upper cladding 1a as described above, the value B of the birefringence occurring in the optical waveguide portion 10 can be made into $|B| \leq 5.34 \times 10^{-5}$ as described above.

In addition, in the embodiment, since the upper cladding is composed as shown above, the thermal expansion coefficient of the upper cladding can be made into an adequate value. That is, in the embodiment, where it is assumed that the thermal expansion coefficient of the upper cladding is $\alpha g$, and the thermal expansion coefficient of a silicon substrate is $\alpha s$, $\alpha s - 2.0 \times 10^{-7} \leq \alpha g \leq \alpha s + 2.0 \times 10^{-7}$ is established.

Further, in the embodiment, the thickness of the upper cladding is determined to be approx. 30 μm. The core 2 is formed by doping $GeO_2$ onto silica-based glass that forms the lower cladding 1b. The refractive index of the core 2 is formed greater than the refractive index by concentration of doped $GeO_2$.

Figure 2:
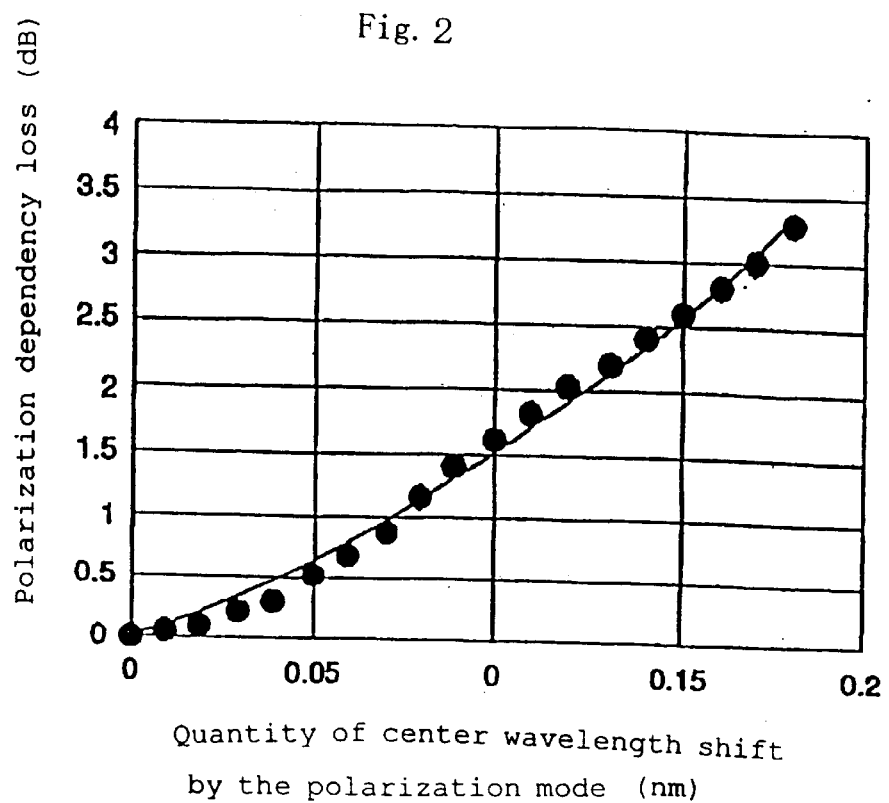
FIG. 2 is a graph showing the relationship between the quantity of center wavelength shift and the polarization dependency loss in the polarization mode in an arrayed waveguide grating having an optical waveguide construction illustrated in FIG. 1.

In addition, the present inventor determined the construction of the embodiment by having carrying out the examinations described below. First, as described above, in the arrayed waveguide grating, the following points were confirmed on the basis of the results of examinations based on FIG. 2. That is, if the range of the quantity $\Delta \lambda_B$ of center wavelength shift in the polarization mode (TE mode and TM mode) in the arrayed waveguide grating is 0.05 nm or less, it is possible to set the value of the polarization dependency loss (PDL) to an adequate value which is 0.5 dB or less. In other words, in the arrayed waveguide grating, by setting the range of the abovementioned $\Delta \lambda_B$ to 0.05 nm or less, it is possible to suppress the influences of the polarization dependency loss without providing any half-wave plate 3 where the optical waveguide circuit is applied to an optical wavelength multiplexed transmission system.

And in the arrayed waveguide grating, in order to set the range of the abovementioned $\Delta \lambda_B$ to a value which is 0.05 nm or less, the range of the value B of the birefringence occurring in the optical waveguide portion 10 is obtained on the basis of the equation (1). In addition, it was assumed that the value of $\lambda_O$ substituted in the equation (1) is 1550 nm that is the center wavelength in the optical wavelength multiplexed transmission system, which is now under consideration. Also, it was assumed that the value nc substituted in the equation (1) is 1.45 which is the refractive index of pure silica glass when light having a wavelength of $\lambda_O$ was made incident. As a result, since it is found that, if $|B| \leq 5.34 \times 10^{-5}$ was established, it would be satisfactory, and the value B of the birefringence occurring in the optical waveguide portion 10 was set to $|B| \leq 5.34 \times 10^{-5}$.

Figure 7:
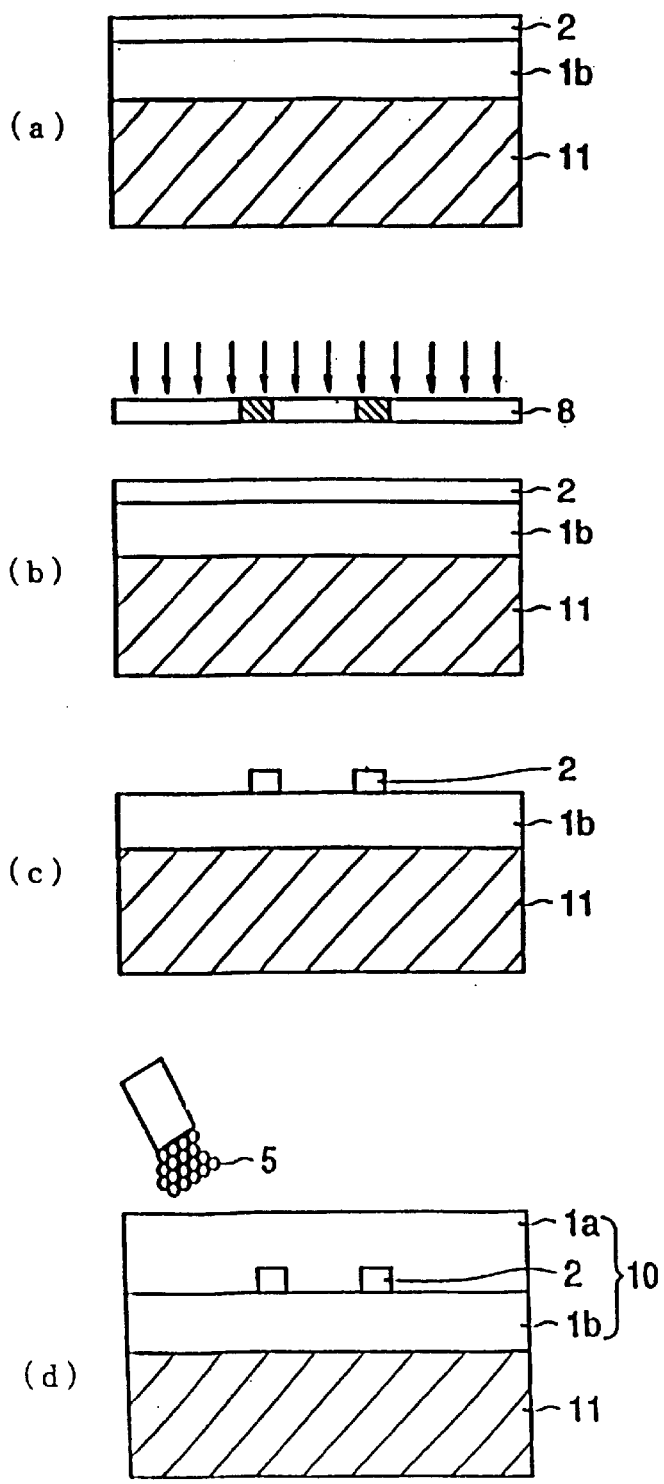
FIG. 7 is an exemplary view showing the manufacturing process of an optical waveguide circuit.

In addition, the present inventor carried out the following experiments. That is, in a circuit in which a lower cladding 1b and a core 2 are formed on a silicon substrate 11 by processes (a) through (c) illustrated in FIG. 7, a matching oil having the same refractive index as that of the upper cladding 1a was dropped instead of providing the upper cladding 1a. And, the matching oil was used as a quasi-upper cladding 1a, and the polarization dependency loss was measured. Herein, the shift quantity of optical transmission center wavelength due to a difference between the TE mode and TM mode became 0 (zero). Further, the quantity of shift was 0.2 nm or so in the prior art arrayed waveguide grating.

The present inventor considered this phenomenon to be as described below. That is, the quasi-upper cladding in which a matching oil was dropped at a room temperature does not provide the core 2 with any thermal stress nor provide the core 2 with any stress strain because it is liquid. Therefore, the matching oil being the quasi-upper cladding does not result in any deformation of the core 2, and no center wavelength shift occurs in line with deformation of the core 2 . To the contrary, in the prior art arrayed waveguide grating, the birefringence occurring in the optical waveguide portion 10 becomes large. Accordingly, it is considered that, in the prior art arrayed waveguide grating, the large birefringence causes a large shift to occur in the optical transmission center wavelength due to a difference in polarization between the TE mode and TM mode as described above.

The inventor found out that, in order suppress the shift in the center wavelength due to the difference in polarization and to suppress the polarization dependency loss, the composition of the upper cladding 1a is optimized, and the value B of the birefringence of the optical waveguide portion 10 may be established in the abovementioned range.

Also, conventionally, when manufacturing the arrayed waveguide grating, as described above, cladding glass particles which becomes the upper cladding have been sintered at a temperature from 1200 through 1250° C. when forming the upper cladding 1a. However, since the consolidating temperature is higher than the glass transfer temperature of the core 2, the core 2 may be deformed when consolidating the same, and thermal stress is provided on the core 2 in the cooling process of the upper cladding 1a. Accordingly, it was found that the deformation and stress would cause polarization dependency loss to occur, resulting from deformation and stress.

Therefore, in the embodiment, by doping $B_2O_3$ and $P_2O_5$ onto pure silica glass at a ratio of approx. 8 mole % with respect to the upper cladding 1a, the abovementioned sintering temperature is set to approx. 1100° C. that is lower than approx. 1150° C. being the glass transfer temperature of the core 2 to produce an arrayed waveguide grating. Further, the thickness of glass particles which will become the upper cladding 1a was set to approx. 300 $\mu$m. And, by sintering the glass particles at approx. 1100° C., the upper cladding having a thickness of approx. 30 $\mu$m could be formed.

Next, noting that the value B of the birefringence can be expressed by the following equation (2), the inventor considered optimization of the thermal expansion coefficient of the upper cladding 1a.

$$B = (C_2 - C_1) E_g (\alpha g - \alpha s) \Delta T \tag{2}$$

Also, in the equation (2), $C_1$ is a photoelastic constant of the upper cladding horizontal to the direction of polarization of incident light, and $C_2$ is a photoelastic constant of the upper cladding 1a vertical to the direction of polarization of the incident light. Also, in the equation (2), Eg is the Young's modulus of the upper cladding 1a, and $\alpha g$ and $\alpha s$ are, respectively, the thermal expansion coefficients of the upper cladding and the silicon substrate. $\Delta T$ is a decrement in a lowering of the temperature from a state where silica based glass forming the upper cladding is solidified, to room temperature.

Therefore, in the equation (2), the following values are substituted in the respective parameters to obtain a thermal expansion coefficient $\alpha g$ of the upper cladding 1a so that $|B| \leq 5.34 \times 10^{-5}$ can be obtained. That is, in the equation (2), $C_1$ was made into $-0.65 \times 10^{-12}$ ($Pa^{-1}$) that is the photoelastic constant of silica glass horizontal to the direction of polarization of the incident light. $C_2$ was made into $-4.22 \times 10^{-12}$ ($Pa^{-1}$) that is the photoelastic constant of silica glass vertical to the direction of polarization of the incident light. Eg was made into 7.29×10-10 (Pa) that is the Young's modulus. $\Delta T$ was made into 1000° C. that is obtained from the consolidating temperature of the upper cladding 1a. Resultantly, where $\alpha s - 2.0 \times 10^{-7} \leq \alpha g \leq \alpha s + 2.0 \times 10^{-7}$ is assumed, it is found that $|B| \leq 5.34 \times 10^{-5}$ can be established.

Therefore, in the embodiment, as described above, $\alpha s - 2.0 \times 10^{-7} \leq \alpha g \leq \alpha s + 2.0 \times 10^{-7}$ was employed. Also, the composition of the upper cladding 1a was determined as follows, in order that the value B of the birefringence of the optical waveguide portion 10 was set to $|B| \leq 5.34 \times 10^{-5}$ and the thermal expansion coefficient $\alpha g$ of the upper cladding 1a was set to $\alpha s - 2.0 \times 10^{-7} \leq \alpha g \leq \alpha s + 2.0 \times 10^{-7}$. That is, in the embodiment, the upper cladding 1a is formed of silica based glass in which a dopant is doped onto pure silica glass, and the dopant and the concentration thereof were determined on the basis of the data shown in graphs of FIG. 4(a) and FIG. 4(b).

Figure 4:
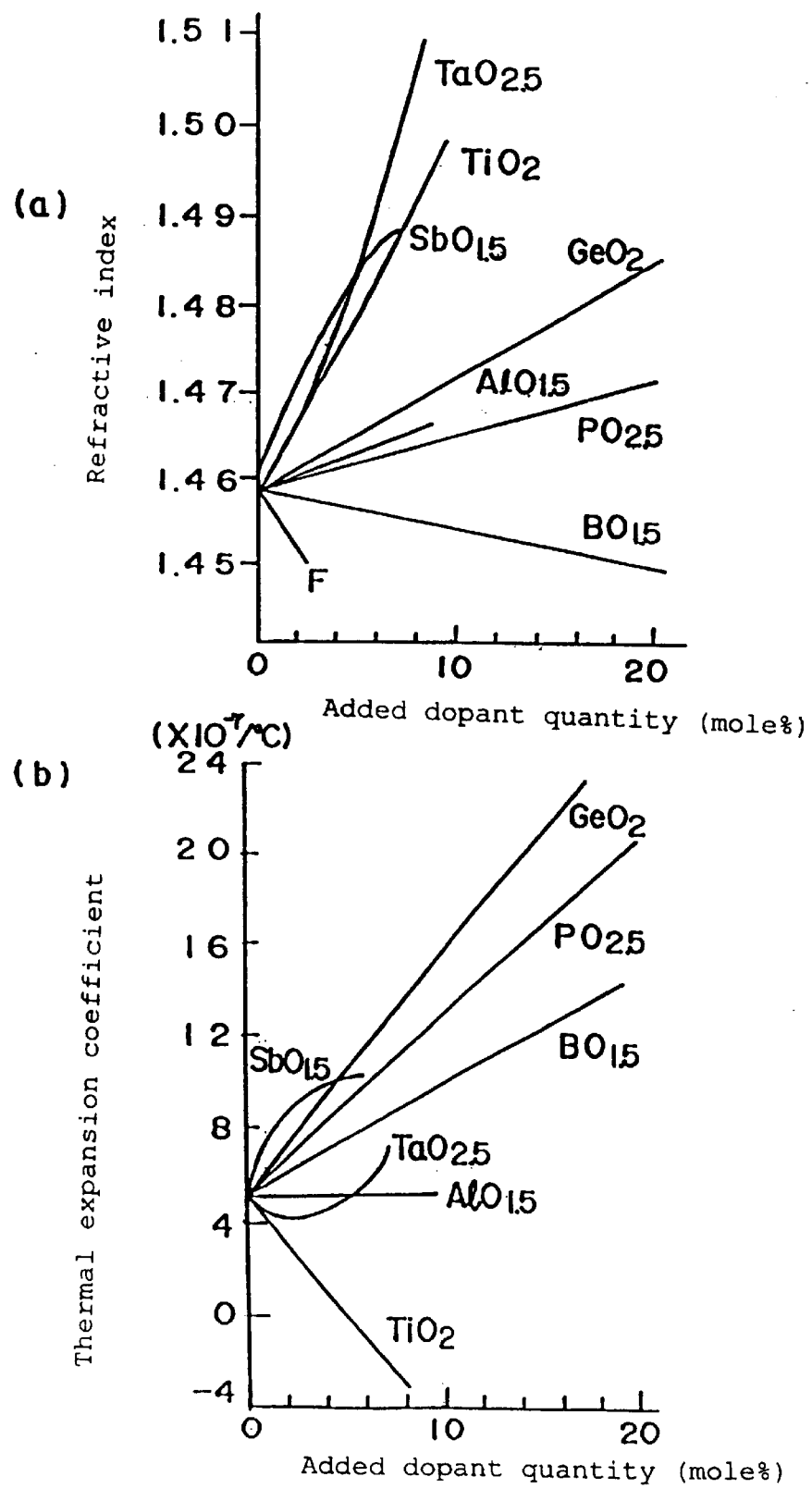
FIG. 4(a) is a graph showing the relationship between added quantities of dopant that is doped onto pure quartz ($SiO_2$), and the refractive indexes.
FIG. 4(b) is a graph showing the relationship between the added dopant quantities and thermal expansion coefficients.

Herein, as shown in FIG. 4(a), based on the relationship between the concentration of added dopant corresponding to the type of dopant and the refractive index, the relationship between the added concentration of a dopant to be doped onto pure silica glass and the refractive index of silica-based glass to be formed can be obtained. On the other hand, based on the relationship between the added quantities of the dopant and the thermal expansion coefficients, which are shown in FIG. 4(b), the relationship between the added concentration of the dopant to be doped onto pure silica glass and the refractive index of silica-based glass to be formed can be obtained.

In addition, the refractive indexes shown in the same drawing (a) are refractive indexes when light of Na-D line is caused to enter. The Na-D line light is light having a shorter wavelength than a wavelength of 1550 nm that is the center wavelength in the wavelength band used for optical wavelength multiplexed transmissions. Therefore, the refractive indexes shown in the same drawing (a) generally become a higher value in comparison with a case where light has a wavelength of 1550 nm. For example, although the refractive index of pure silica glass having no dopant becomes 1.458, as described above, the refractive index of pure silica glass is approx. 1.44 when light of 1550 nm is caused to enter. Therefore, when the relationship between the added concentrations of the dopant to be doped on the upper cladding 1a and the refractive indexes of silica-based glass to be formed is obtained, the abovementioned relationship has been obtained, taking such a refractive index shift concentration into consideration.

And, based on these relationships, in the embodiment, dopants to be doped onto pure quartz in order to form the upper cladding 1a are determined to be $B_2O_3$ and $P_2O_5$, and the doping concentrations thereof were determined to be approx. 8 mole %. In the embodiment, by composing the upper cladding 1a as described above, the refractive index of the upper cladding 1a was set to the same value as that of pure silica glass ($SiO_2$). Also, by making the composition of the upper cladding 1a as shown above, the thermal expansion coefficient $\alpha g$ of the upper cladding 1a was designed so that it became $\alpha s - 2.0 \times 10^{-7} \leq \alpha g \leq \alpha s + 2.0 \times 10^{-}$.

And, when cladding glass particles that form the upper cladding 1a are deposited, the dopants determined as described above were doped thereon. Also, in fact, since evaporation of the dopants during the deposition thereof must be taken into consideration, through trial and error, the added concentrations of the dopant was adjusted to adequate values before and after the doping concentration becomes the abovementioned value (that is, the doping quantities of $B_2O_3$ and $P_2O_5$ become approx. 8 mole %). And, the composition of the upper cladding 1a was determined, by the adjustment, so that the value B of the birefringence of an optical waveguide portion 10 becomes $|B| \leq 5.34 \times 10^{-5}$ and the thermal expansion coefficient $\alpha g$ of the upper cladding 1a becomes $\alpha s - 2.0 \times 10^{-7} \leq \alpha g \leq \alpha s + 2.0 \times 10^{-}$.

Also, with respect to an optical waveguide circuit of the embodiment which was actually produced, the thermal expansion coefficient of the first cladding 1a was obtained by the following calculations.

The internal stress a occurring in the optical waveguide circuit can be expressed by the following equation (3) where it is assumed that warping in the direction of the substrate of the optical waveguide circuit is R.

$$\sigma = \{E_a b^2\} / \{6(1 - y_s) R \cdot d\} \tag{3}$$

Also, in the above expression (3), $E_a$ is the Young's modulus of the silicon substrate 11, and the value thereof is $1.3 \times 10^{11}$(Pa). Also, b is the thickness of the silicon substrate 11. In the embodiment, the value thereof is $1.0 \times 10^{-3}$ (m) $\cdot Y_s$ is the Poisson ratio of the silicon substrate 11, the value of which is 0.28. In addition, d is the thickness of the upper cladding 1a (that is, the distance from the upper plane of the lower cladding 1b to the upper plane of the upper cladding 1a), the value of which is $0.03 \times 10^{-3}$ (m).

Further, the thermal stress $\alpha\tau$ occurring in the optical waveguide circuit can be expressed by the following equation (4).

$$\sigma\tau = E_g(\alpha g - \alpha s)\Delta T \qquad (4)$$

Also, in the equation (4), $E_g$ is the Young's modulus of the upper cladding 1a, wherein when the value thereof is approximated by the value of pure silica glass, it is $7.29 \times 10^{-10}$ (Pa). In addition, in the equation (4), Eg, $\alpha g$, $\alpha s$, and $\Delta T$ are similar to those in the equation (2), and the values thereof are also similar to those in the equation (2), Herein, where it is assumed that all the abovementioned internal stresses are generated by the thermal stress, $\sigma = \sigma\tau$ can be established. Based on the equations (3) and (4), the following equation (5) can be introduced.

$$\alpha g = \alpha s + [\{E_g b^2\}/\{6Eg(1-y_s)d \cdot R \cdot \Delta T\}] \qquad (5)$$

Therefore, the quantity of warping of the optical waveguide circuit produced as described above was measured by a contact-type surface shape measuring device, and the quantity of warping is substituted in the equation (5), whereby an actual value of the thermal expansion coefficient of the upper cladding 1a was obtained. At this time, $\alpha s = 3.0 \times 10^{-6}$ C.$^{-1}$ is used as the thermal expansion coefficient of the silicon substrate.

As a result, since the warping radius R of the optical waveguide circuit became 258 m, it was confined that the thermal expansion coefficient $\alpha g$ of the upper cladding 1a becomes $2.95 \times 10^{-6}$ C.$^{-1}$. Also, at this time, the optical waveguide circuit was warped convexly upward (that is, the silicon substrate 11 side is made concave) where the silicon substrate misplaced downside. Accordingly, by substituting the value of $2.95 \times 10^{-6}$ C.$^{-1}$ of the thermal expansion coefficient $\alpha g$ of the upper cladding 1a in the equation (2), the value B of the birefringence was obtained. Resultantly, the value B of the abovementioned birefringence was a positive value of $1.26 \times 10^{-5}$.

In the embodiment, based on the results of the abovementioned examinations, the value B of birefringence occurring in the optical waveguide portion 10 was determined to be $|B| \leq 5.34 \times 10^{-5}$, and the difference between the thermal expansion coefficient $\alpha g$ of the upper cladding 1a and the thermal expansion coefficient $\alpha s$ of the silicon substrate was determined to be a value ($2.95 \times 10^{-6}$ C.$^{-1}$) smaller than and including $2.0 \times 10^{-7}$. Therefore, the quantity of center wavelength shift in the TE mode and TM mode in the arrayed waveguide grating can be set to an adequate value that is 0.05 nm or less, whereby the value of the polarization dependency loss (PDL) can be set to an adequate value that is 0.5 dB or less.

Accordingly, in a case where an arrayed waveguide grating according to the embodiment is applied to an optical wavelength multiplexed transmission system having a wavelength band of 1.55 μm, influences of the polarization dependency loss can be suppressed without providing any half-wave plate 3. And, since an arrayed waveguide grating according to the embodiment does not require any half-wave plate 3, the number of manufacturing processes thereof can be reduced to decrease the production costs thereof.

In addition, since the arrayed waveguide grating according to the embodiment does not need any half-wave plate 3, no light reflected from the half-wave plate 3 is returned to the incidence side of an incidence waveguide 12, whereby it is possible to prevent the return loss from being increased. Still further, with the arrayed waveguide grating according to the embodiment, it is possible to suppress a lowering of the yield resulting from a mistake that may occur in formation of an insertion groove of the half-wave plate 3 and in insertion and fixation thereof. Still further, the arrayed waveguide grating according to the embodiment enables the provision of 320 or more arrayed waveguides at intervals of 25 μm.

In addition, it is generally known that, as a glass material receives a tensile stress, cracks are liable to occur in order to release the stress. Contrary to this, the embodiment causes the silicon substrate 11 side to become convex in a case where warping arises due to heating in a production process of arrayed waveguide gratings, wherein the stress provided on the optical waveguide portion 10 side formed of a glass-based material is a compression stress. Therefore, the arrayed waveguide grating according to the embodiment can evade the fear that cracks are liable to occur due to the tensile stress.

Figure 3:
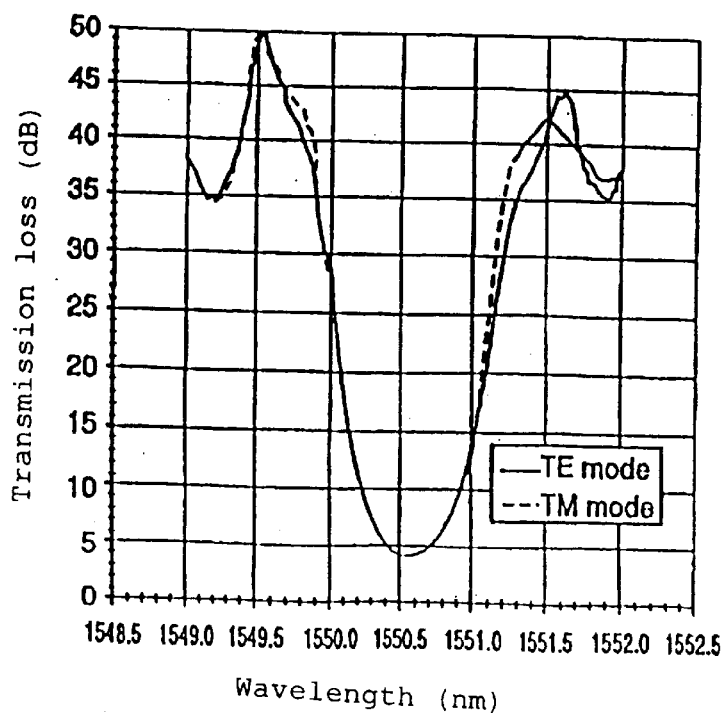
FIG. 3 is a graph showing one example of transmission spectrum per wave polarization in the first embodiment of an optical waveguide circuit according to the invention.

Also, in fact, transmission spectra in the TE mode and TM mode of an arrayed waveguide grating according to the embodiment were measured per wave polarization, wherein the spectra becomes like such spectra as shown in FIG. 3. As shown in the same drawing, in the arrayed waveguide grating according to the embodiment, a shift between the center wavelength in the spectra in the TE mode and the center wavelength in the spectra in the TM mode is only 0.1 mn or less. Based on measurement, it can be confirmed that, in the arrayed waveguide grating according to the embodiment, the shift between the center wavelength in the spectra in the TE mode and that in the spectra in the TM mode is suppressed to one-twentieth or less of the value (approx. 0.2 nm) in the prior art arrayed waveguide gratings.

Next, a description is given of the second embodiment of an optical waveguide circuit according to the invention. The second embodiment is similar to the first embodiment. A characteristic point of the second embodiment, which differs from the first embodiment, resides in that the composition of the core 2 and upper cladding 1a is different from those in the first embodiment, whereby the glass transfer temperature of the core 2 and thermal expansion coefficient of the upper cladding 1a are different from those in the first embodiment.

In further detail, in the second embodiment, the core 2 is made of $TiO_2$ doped silica glass ($SiO_2$—$TiO_2$), whereby the glass transfer temperature of the core 2 became approx. 1200° C. In addition, the upper cladding 1a was formed by doping $B_2O_3$ at a ratio of 10 mole %, $P_2O_5$ at a ratio of 1 mole %, and $GeO_2$ at a ratio of 10 mole % to silica glass ($SiO_2$). Thereby, the sintering temperature of the upper cladding 1a was determined to be approx. 1150° C. Also, these compositions were determined as in the first embodiment.

In the optical waveguide circuit according to the second embodiment, where a warping quantity thereof is obtained as in the abovementioned first embodiment, the warping radius R was 120 m. Based on the value of the warping radius R, the thermal expansion coefficient of the upper cladding 1a, which is obtained from the equation (5), was $3.1 \times 10^{-6}$°C.$^{-1}$. Also, in the second embodiment, the abovementioned warping was made concave upward (that is, the optical waveguide portion side was made concave) with the silicon substrate 11 placed downside, differing from the first embodiment. Using a value of $3.1 \times 10^{-6}$°C.$^{-1}$ of the thermal expansion $\alpha g$ of the upper cladding 1a, the value B of the birefringence was a negative value of $-2.7\times10^{-5}$ based on the equation (2).

The second embodiment can bring about effects almost similar to those of the first embodiment.

Figure 5:
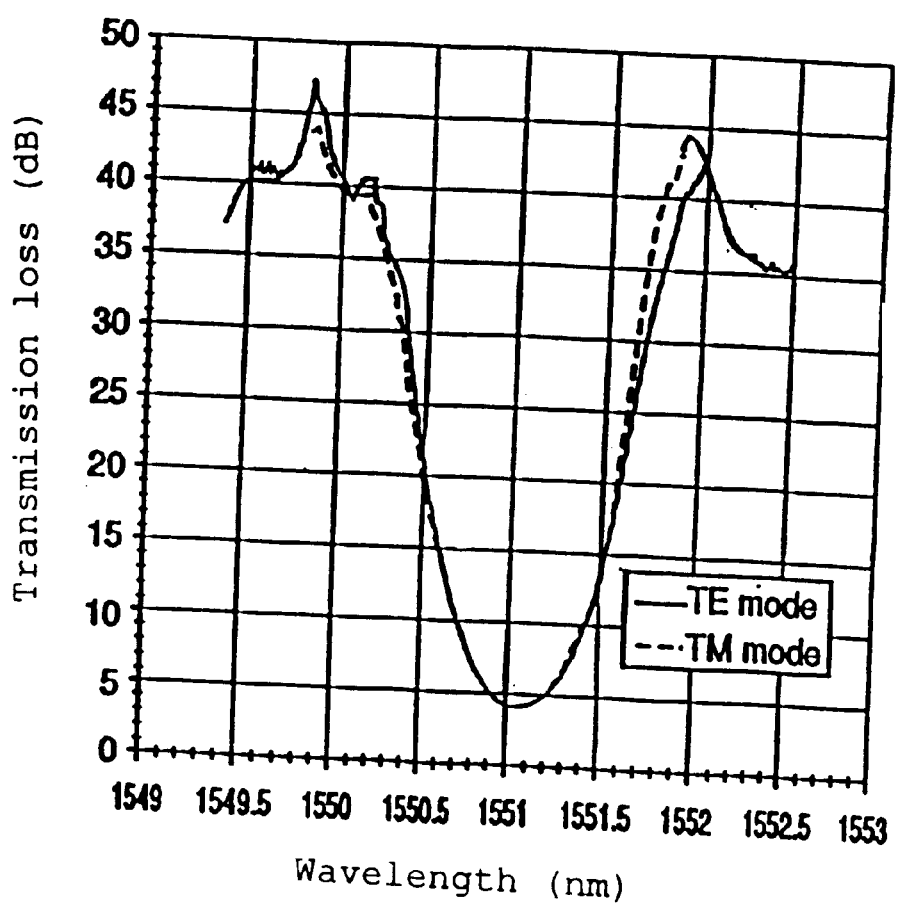
FIG. 5 is a graph showing one example of transmission spectrum per wave polarization in the second embodiment of an optical waveguide circuit according to the invention.

Also, in fact, the transmission spectra, per wave polarization, in the TE mode and TM mode of an arrayed waveguide grating according to the second embodiment were measured, wherein the transmission spectra became as shown in FIG. 5. As shown in the same drawing, a difference between the center wavelength of the spectra in the TE mode and the center wavelength of the spectra in the TM mode was 0.02 nm or less. Based on the results of the measurement, it could be confined that the arrayed waveguide grating according to the second preferred embodiment could remarkably suppress the quantity of shift between the center wavelength in the TE mode spectra and the center wavelength in the TM mode spectra.

In addition, the invention is not limited to the above embodiments, but may be subjected to various embodiments. For example, in the first embodiment, the upper cladding 1a was formed of silica-based glass ($SiO_2$—$B_2O_3$—$P_2O_5$ based) in which $B_2O_3$ and $P_2O_5$ are, respectively, doped onto pure silica glass at a ratio of approx. 8 mole %. And, in the first embodiment, the core 2 was formed by further doping $GeO_2$ onto silica-based glass that forms the lower cladding 1b. In the second embodiment, the upper cladding 1a was formed by doping $B_2O_3$ at a ratio of 10 mole %, $P_2O_5$ at a ratio of 1 mole %, and $GeO_2$ at a ratio of 10 mole % to silica glass ($SiO_2$), and the core 2 was formed of $TiO_2$—doped silica glass ($SiO_2$—$TiO_2$). However, the compositions of the upper cladding 1a and core 2 are not limited to such compositions, but they may be adequately set as necessary.

That is, the important points of the invention are that (1) the value B of birefringence occurring in an optical waveguide portion 10 (the upper cladding 1a, core 2, and lower cladding 1b) is made into $|B|\leq 5.34\times 10^{-5}$ and (2) the thermal expansion coefficient αg of the upper cladding 1a is made into $\alpha s-2.0\times 10^{-7}\leq\alpha g\leq\alpha s+2.0\times 10^{-7}$ where the thermal expansion coefficient of the silicon substrate 11 is assumed to be αs. Therefore, in the invention, the composition of the upper cladding 1a is determined so as to meet the conditions (1) and (2), and the composition of the core 2 is determined so that the refractive index thereof is made larger than that of the cladding 1.

In addition, an optical waveguide circuit according to the respective embodiments is an arrayed waveguide grating. However, the optical waveguide circuit of the invention is not necessarily set to the arrayed waveguide grating. That is, the invention is applicable to various optical waveguide circuits in which an optical waveguide portion having the lower cladding 1b, core 2 and upper cladding 1a, which are formed of silica-based glass, is formed on a silicon substrate.

INDUSTRIAL APPLICABILITY

As described above, an optical waveguide circuit according to the invention enables composition of arrayed waveguide gratings, which can be juxtaposed at a high density at intervals of, for example, 25 μm, is excellent in return loss properties, and can suppress influences of polarization dependency loss, and the optical waveguide circuit is suitable as optical transmission elements for high bit rate optical wavelength multiplexed transmissions.

Numerous modifications and variations of the present invention are possible in light of the above teachings. It is therefore to be understood that within the scope of the appended claims, the invention may be practiced otherwise than as specifically described therein.

What is claimed as new and desired to be secured by Letters Patent of United States is:

1. An optical waveguide comprising:

an optical waveguide portion formed on a silicon substrate and including a lower cladding, a core, and an upper cladding formed of silica-based glass, wherein a value B of birefringence occurring in said optical waveguide portion is $|B|\leq 5.34\times 10^{-5}$.

2. An optical waveguide according to claim 1, wherein:.

the upper cladding has a thermal expansion coefficient αg, the silicon substrate has a thermal expansion coefficient αs, and $\alpha s-2.0\times 10^{-7}\leq\alpha g\leq\alpha s+2.0\times 10^{-7}$.

3. An optical waveguide circuit comprising:

an optical waveguide portion formed on a silicon substrate and including
   a lower cladding,
   an upper cladding, and
   a core, including
       a first slab waveguide connected to an emission side of one or more juxtaposed optical input waveguides,
       a plurality of juxtaposed arrayed waveguides, having wavelengths different from each other and configured to propagate light introduced from said first slab waveguide, connected to an emission side of said first slab waveguide,
       a second slab waveguide connected to an emission side of said plurality of arrayed waveguides, and
       a plurality of juxtaposed optical output waveguides connected to an emission side of said second slab waveguide,
   wherein said optical input waveguides are configured to output a plurality of optical signals having wavelengths different from each other, said arrayed waveguides are configured to propagate said optical signals with a difference in phase for each wavelength, and said optical output waveguides are configured to input said optical signals differing by wavelength, and
   said lower cladding, said core, and said upper cladding being formed of silica-based glass, wherein a value B of birefringence occurring in said optical waveguide portion is $|B|\leq 5.34\times 10^{-5}$.

4. An optical waveguide circuit according to claim 3, wherein:

the upper cladding has a thermal expansion coefficient αg, the silicon substrate has a thermal expansion coefficient αs, and $\alpha s-2.0\times 10^{-7}\leq\alpha g\leq\alpha s+2.0\times 10^{-7}$.

* * * * *